US008090459B2

(12) United States Patent
Hsu

(10) Patent No.: US 8,090,459 B2
(45) Date of Patent: Jan. 3, 2012

(54) GUIDING-TOUR SYSTEM AND APPARATUS

(76) Inventor: Chia-Yi Hsu, Taipei (TW)

( * ) Notice: Subject to any disclaimer, the term of this patent is extended or adjusted under 35 U.S.C. 154(b) by 1034 days.

(21) Appl. No.: 11/920,520

(22) PCT Filed: May 18, 2006

(86) PCT No.: PCT/CN2006/001017
§ 371 (c)(1),
(2), (4) Date: Nov. 16, 2007

(87) PCT Pub. No.: WO2006/133620
PCT Pub. Date: Dec. 21, 2006

(65) Prior Publication Data
US 2009/0132073 A1 May 21, 2009

(30) Foreign Application Priority Data
May 19, 2005 (CN) .......................... 2005 1 0072751

(51) Int. Cl.
G06F 17/00 (2006.01)
(52) U.S. Cl. ........................................... 700/94; 381/77
(58) Field of Classification Search .................... 700/94; 381/77
See application file for complete search history.

(56) References Cited

U.S. PATENT DOCUMENTS

| 4,824,375 A * | 4/1989 | Weiner ........................... 434/319 |
| 5,461,371 A * | 10/1995 | Matsumoto et al. ........... 340/8.1 |
| 5,732,326 A * | 3/1998 | Maruyama et al. ........... 455/66.1 |
| 5,796,351 A * | 8/1998 | Yabuki ........................... 340/10.6 |
| 5,797,125 A * | 8/1998 | Hirohama ....................... 704/277 |
| 5,929,848 A * | 7/1999 | Albukerk et al. .............. 715/700 |
| 7,240,108 B2 * | 7/2007 | Smith et al. .................... 709/223 |

* cited by examiner

Primary Examiner — Davetta W Goins
Assistant Examiner — Joseph Saunders, Jr.
(74) Attorney, Agent, or Firm — Guice Patents PLLC

(57) ABSTRACT

A guiding-tour system and apparatus, including: at least one host, which adheres or near to an exhibition object, and sets an unique discriminate number corresponding to the exhibition object, has a memory slot and at least one wireless transceiver module, at least one memory card is inserted into the slot, a voice guiding-tour data digital file of the exhibition object is recorded in the memory card, and transmits the digital file in the memory card in a wireless manner via the wireless transceiver module; at least one slave handheld by a visitor, the slave being a portable guiding-tour handheld by the visitor, which at least has a wireless transceiver module, may start a download program in a wireless manner, and downloads the voice guiding-tour data digital file stored in the memory card of the host to the slave handheld by the visitor, and playbacks it according to an instruction from the visitor.

2 Claims, 7 Drawing Sheets

GUIDING-TOUR SYSTEM AND APPARATUS

BACKGROUND OF THE INVENTION

1. Field of the Invention

The present invention relates generally to a voice guiding-tour system and more particularly, to a multi-language voice guiding-tour system for multiple exhibition objects that has voice guiding-tour data digital files of different languages respectively stored in different hosts corresponding to different exhibition objects such that every visitor can use a handheld slave to receive the voice guiding-tour data digital file of each exhibition object and to playback the respective voice guiding-tour data digital file, improving the management efficiency and utility of the voice guiding-tour system and its service quality.

2. Description of the Related Art

Everybody knows that museum has its place and effect in culture, science, education, and many other fields. Actually, a museum brings effect in travel industry economics. Giving full play to a museum in its influence and its economic potential, the museum must become an interesting and attractive place. Actually, a museum is a place full of fun. The question is how to introduce the content of a museum to the society, more particularly, the visitors, in an active and lively manner.

Conventional guiding-tour methods may be performed by text, for example, providing a text description near the painting or sculpture in exhibition for reading by the visitor. However, it takes time to read a guiding-tour text, and a guiding-tour text does not allow reading by many people at a time, and the guiding-tour text and language are within the confines of the space of the exhibition place, not able to satisfy visitors requirements on convenience and guiding-tour content. Other voice guiding-tour methods are known and performed by means of electronic apparatus or people in situ. It is difficult to perform a voice guiding-tour with limited manpower and budge. The cost of hiring professional people for guiding-tour is high. Further, these voice guiding-tour methods are not suitable for an exhibition place crowded with visitors.

Comparatively, using an electronic voice guiding-tour device is the most popularly invited voice guiding-tour method because this method gives every visitor a room for maximum self-control and every visitor can control the rhythm of visit by oneself without affecting others.

Regretfully, a museum, even a worldwide top-class museum, can provide a voice guiding-tour service only for limited exhibition objects. For example, a museum may provide a rentable voice guiding-tour device that has a digital input device. When a user of a rentable voice guiding-tour device reaches an exhibition object carrying a voice guiding-tour mark, the user can input the code of the exhibition object into the rentable voice guiding-tour device to hear the voice introduction of the selected exhibition object. This voice introduction is pre-recorded in the rentable voice guiding-tour device. When adding a new guiding-tour content or modifying the stored guiding-tour content, all rentable voice guiding-tour devices should be updated. It is a big burden to the manager in labor and time. Therefore, rentable voice guiding-tour devices may be not updated in time to satisfy user's requirements. This problem exists because there is no any commercial voice guiding-tour system for museum that is service-oriented, easy to maintain and easy to update the guiding-tour content.

SUMMARY OF THE INVENTION

The present invention has been accomplished under the circumstances in view. In view of the drawbacks of conventional guiding-tour devices, the invention provides a guiding-tour system, which stores the guiding-tour content of every exhibition object in each respective host corresponding to one specific exhibition object, and the guiding-tour device handheld by each visitor has communication means to download the voice guiding-tour data digital file from the host of the selected exhibition object for playback subject to the selected language and the user's instruction. The guiding-tour system and apparatus of the present invention provides convenience and utility to the visitor and the manager, improving the service efficiency of the museum.

It is one object of the present invention to provide a guiding-tour system, which has voice guiding-tour contents of exhibition objects respectively stored in respective slaves corresponding to respective exhibition objects, such that the slave that has the necessary communication means and is handheld by one visitor can download the voice guiding-tour data digital file from the host of the selected exhibition object for playback subject to the selected language and the user's instruction.

It is another object of the present invention to provide a voice data establishing and managing method for a guiding-tour system, which has the data digital file of the guiding-tour content of every exhibition object be respectively stored in respective hosts corresponding to respective exhibition objects. The guiding-tour data digital file is recorded in a mobile memory card. When one mobile memory card is inserted into the memory slot of one host, the host automatically checks whether or not the ID of the guiding-tour data digital file is in match with the ID of the exhibition object.

It is another object of the present invention to provide a guiding-tour system voice data establishing and managing method, which enables the voice guiding-tour data digital file of every exhibition object to be stored in a central computer database such that the manager can use a mobile computer or like tool to download the voice guiding-tour data digital file of every exhibition object and then to push the downloaded voice guiding-tour data digital files into the memory devices of the respective hosts corresponding to respective exhibition objects wirelessly, and the host of exhibition object automatically check whether or not the ID of the received guiding-tour data digital file is in match with the ID of the respective exhibition object.

To achieve these and other objects of the present invention, the guiding-tour system comprises at least one host, which adheres or near to an exhibition object, and sets an unique discriminate number corresponding to the exhibition object, has a memory slot and at least one wireless transceiver module, at least one memory card is inserted into the slot, a voice guiding-tour data digital file of the exhibition object is recorded in the memory card, and transmits the digital file in the memory card in a wireless manner via the wireless transceiver module; at least one slave handheld by a visitor, the slave being a portable guiding-tour handheld by the visitor, which at least has a wireless transceiver module, may start a download program in a wireless manner, and downloads the voice guiding-tour data digital file stored in the memory card of the host to the slave handheld by the visitor, and playbacks it according to an instruction from the visitor.

The guiding-tour system voice data establishing and managing method includes the steps of: the manager of the exhibition place inputs the ID number of the exhibition object into a host by means of a keyboard or scanner, so as to lock out the host and the exhibition object; insert the memory card that has recorded therein a voice guiding-tour data digital file into one memory slot of the host wherein the voice guiding-tour data digital file carries the ID code of the exhibition object; the host uses its built-in ID verification software to automatically check whether nor not the ID code carried in the memory card in match with the ID code that is inputted into the host, and then enters standby mode when matched; the host starts a buzzer to remind the manager to change the inserted memory card when the ID code is not matched. The host further has text display device for displaying ID code, file updating date and other information.

An alternate form of the e guiding-tour system voice data establishing and managing method includes the steps of: the manager of the exhibition place uses an optical scanner or RFID reader to read the ID code of every exhibition object into one respective host so as to lock each host with the matched exhibition object; the manager reads the ID code of every exhibition object into a mobile computer or like tool in a same manner, and the mobile computer or like tool downwards voice guiding-tour data digital files of the exhibition objects from a central computer database by means of IEEE802.11 wireless network technology for the advantages of high mobility and convenience; the manager bring the mobile computer or like tool close to each host corresponding to each respective exhibition object to establish a low-power, short-distance wireless network connection such as IrDA or IEEE802.15 PAN (personal area network), for enabling the mobile computer or like tool to push the respective downloaded voice guiding-tour data digital file into the memory device of the respective host corresponding to the respective exhibition object; each host uses its built-in ID verification software to check whether or not the ID code of the received voice guiding-tour data digital file is in match with the ID code of the respective exhibition object, and then enters standby mode when matched; the host starts a buzzer to remind the manager to run the voice guiding-tour data digital file downloading and object-pushing operation again when the ID code is not matched. The object push function is a wireless file transmission method subject to IrDA protocol.

The connection and data download operation between the host and the slave of the voice guiding-tour system according to the present invention includes the steps: the visitor turns on the power of the slave to start system setup); the visitor uses the selection button to select voice guiding-tour data language; the visitor presses the fire button after selection of language; the slave transmits the data of its wireless communication address code and the selected voice guiding-tour data language to the host to start the connection between the host and the slave; the host responds to the slave after connection, and enters paging mode; the LED indicator of the slave emits a first specific color light after start of the paging program, indicating the connection status; after connection, the slave downloads the voice guiding-tour data digital file from the host and its LED indicator keeps emitting the first specific color light, such as flue light; after download of the voice guiding-tour data digital file, the LED indicator of the slave is changed to a second specific color light, for example, green color, indicating completion of download and offline state; the text and graphics display device of the slave displays the language of the voice guiding-tour data digital file for confirmation by the visitor; the visitor presses the replay button to playback the voice guiding-tour data, and can also adjustment buttons for fast forward, reverse, pause, volume adjustment control, and if necessary, repeat play till next download.

DETAILED DESCRIPTION OF THE INVENTION

Figure 1:
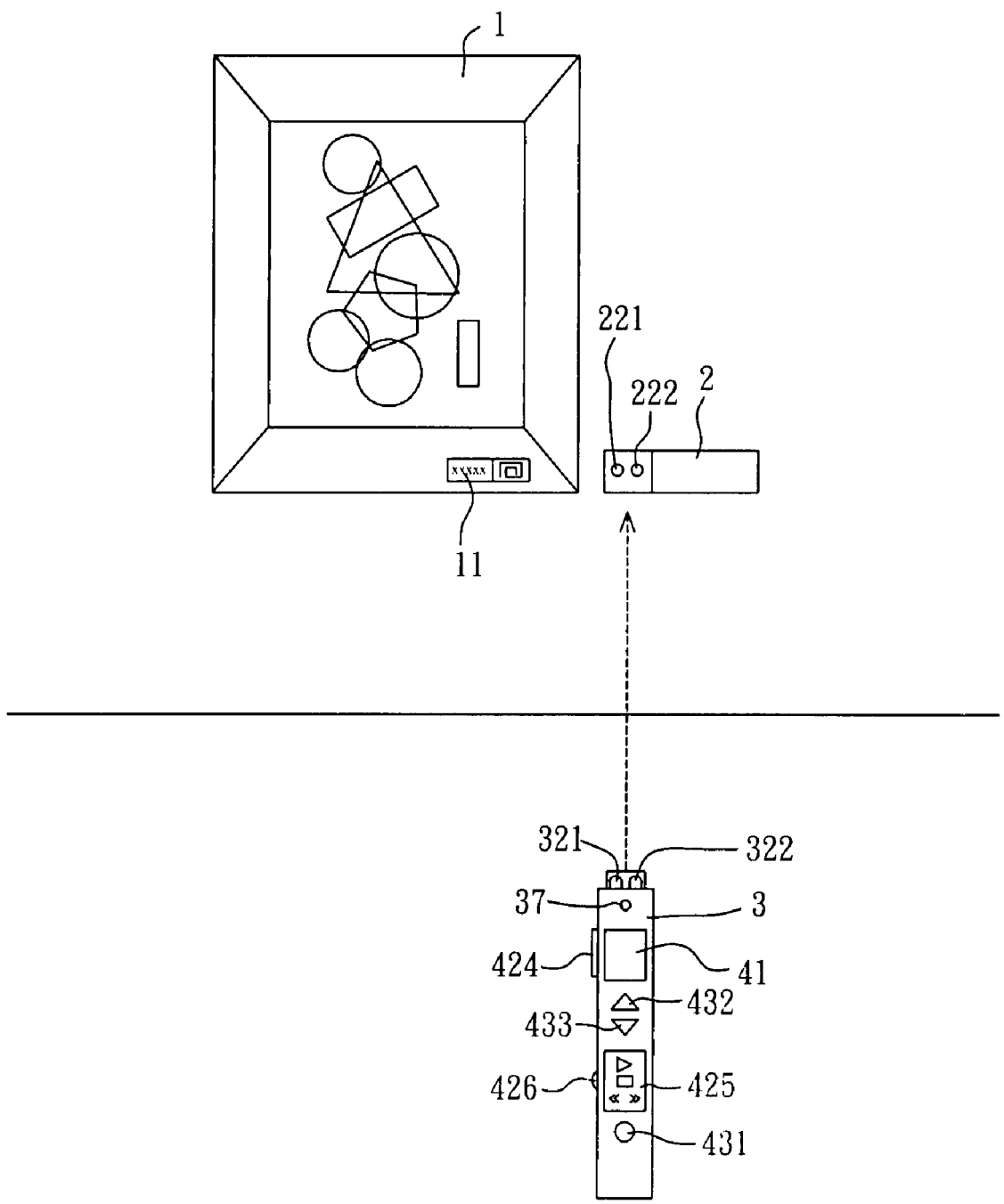
FIG. 1 is a schematic drawing showing the arrangement of a voice guiding-tour system and an exhibition object according to the present invention.

FIG. 1 is a schematic drawing showing the arrangement of a voice guiding-tour system and an exhibition object according to the present invention. As illustrated, the voice guiding-tour system is installed in an exhibition place, for example, museum where multiple exhibition objects 1 are in exhibition. Each exhibition object 1 has a unique ID (identification) number 11. The ID number 11 can be an optical barcode or RFID (radio frequency identification) chip. The voice guiding-tour system includes at least one host 2, and at least one slave 3 handheld by the visitor.

The host 2 is adheres or near to one exhibition object 1, and sets an unique ID number corresponding to the ID number 11 of the exhibition object 1. Preferably, the ID number 11 of the exhibition object 1 is read into the host 2 by means of a machine, avoiding human error.

Figure 2:
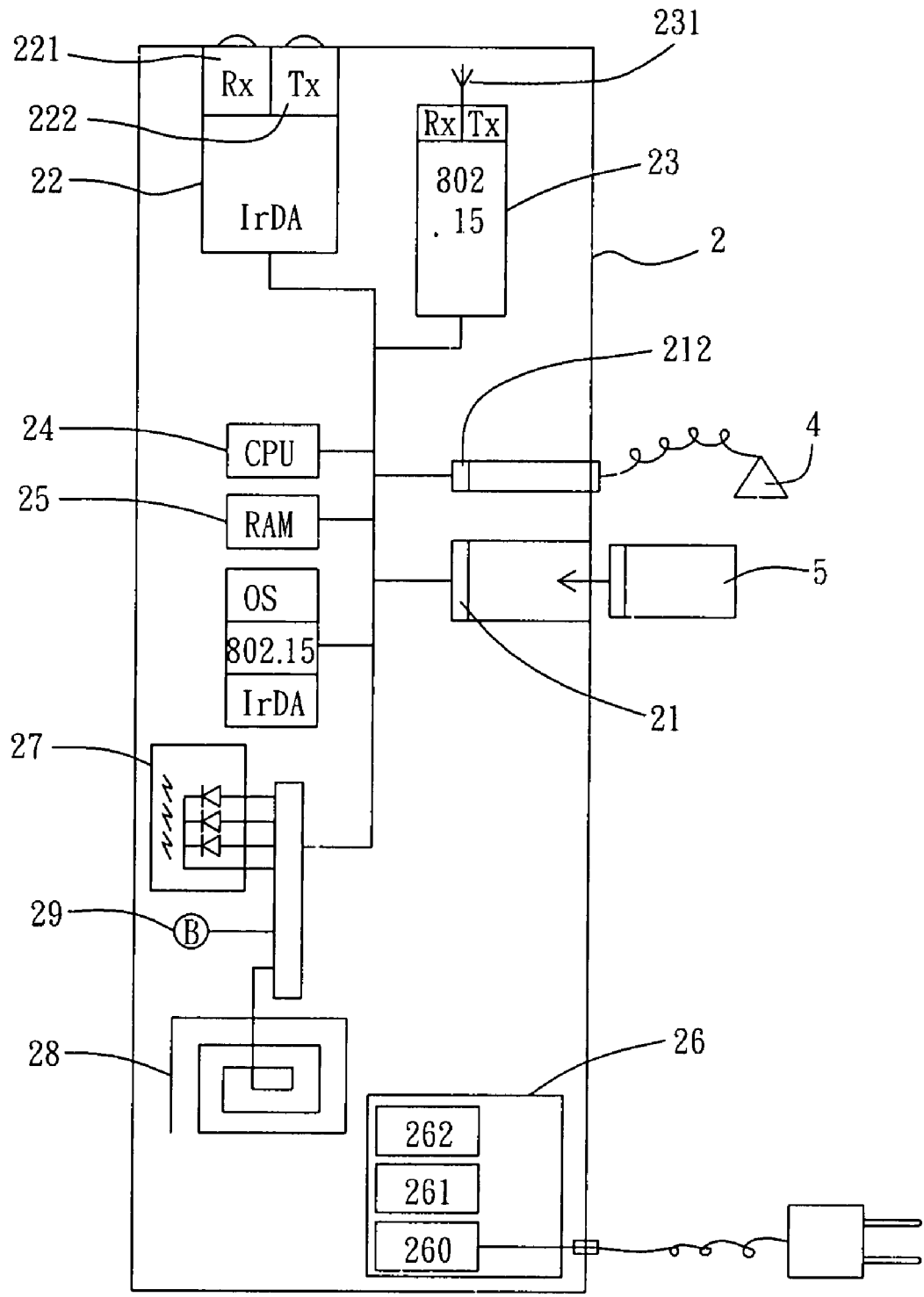
FIG. 2 is a circuit block diagram of the host of the voice guiding-tour system according to the present invention.

Referring to FIG. 2 and FIG. 1 again, the host 2 has a memory slot 21, a first wireless transceiver module 22, and a second wireless transceiver module 23. One memory card 5 is inserted into the memory slot 21. The memory card 5 has recorded therein a voice guiding-tour data digital file, and the storage content in the memory card 5 can be transmitted in a wireless manner via the second wireless transceiver module 23. For easy explanation, the first wireless transceiver 22 according to this embodiment is preferably an infrared IrDA transceiver module, and the second wireless transceiver module 23 is preferably an IEEE802.15 transceiver module. However, this arrangement is not a limitation.

Figure 3:
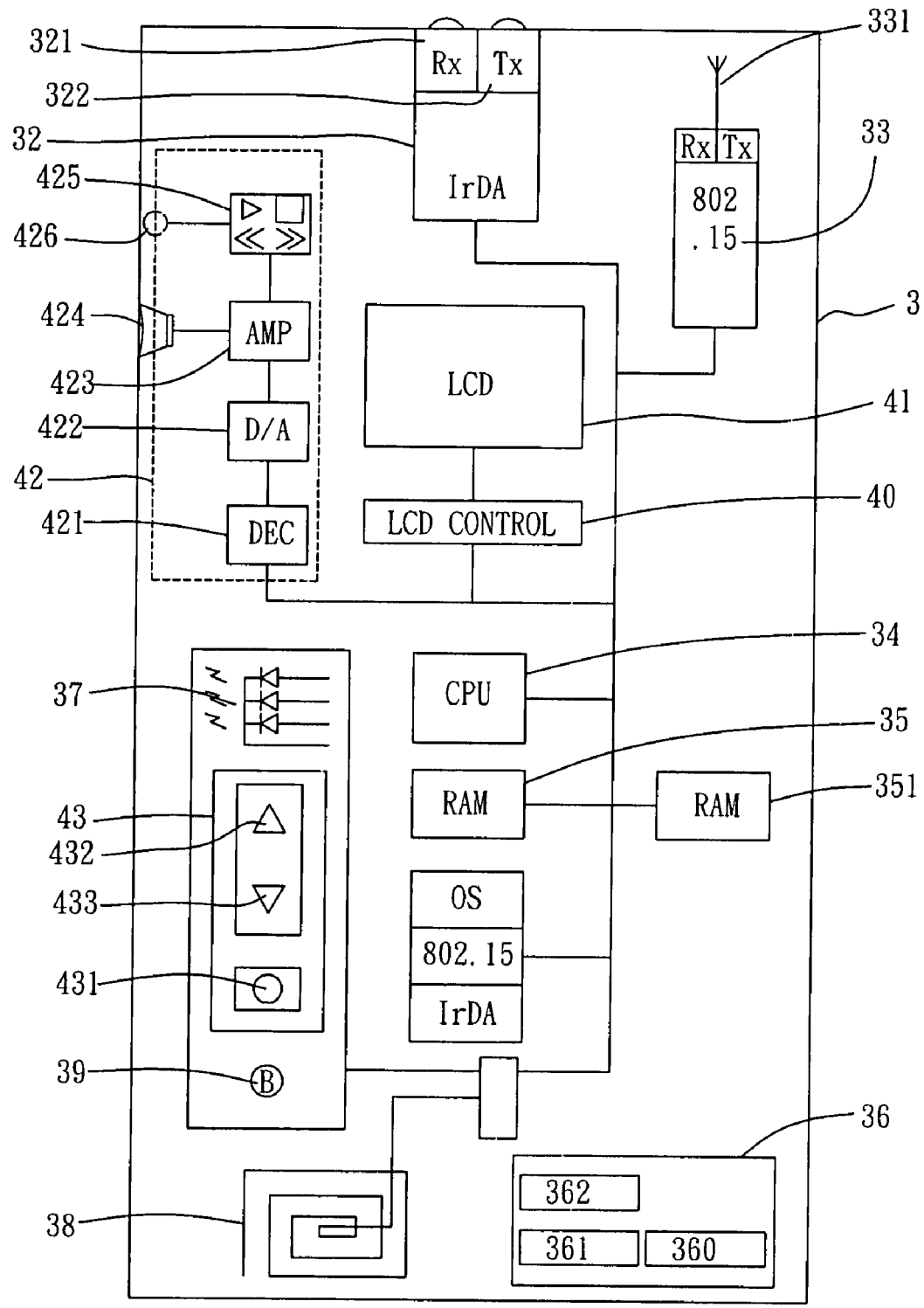
FIG. 3 is a circuit block diagram of the slave of the voice guiding-tour system according to the present invention.

Referring to FIG. 3 and FIG. 1 again, the slave 3 has a first wireless transceiver module 32 that is same as the infrared IrDA transceiver module of the host 2, and a second wireless transceiver module 33 that is same as the IEEE802.15 transceiver module of the host 2. The slave 3 transmits the address code (the address code of IEEE802.15 has 48 bits that is set in factory) of its second wireless transceiver module 33 and the selected language code to the host 2 via the first transceiver module 32 to open on-line program. The host 2 sets its paging frequency subject to the address code of the slave 3, and pages the slave 3 for connection. After establishment of piconet, the slave 3 downloads the voice guiding-tour data digital file stored in the memory card 5 of the host 2, and playbacks it according to the instruction from the visitor.

During application, the visitor uses the upward selection button 432, downward selection button 433 and display device 41 of the slave 3 (see FIG. 3) to select language, and then aim the infrared transmitting and receiving side of the slave 3 at the infrared transceiver module 22 of the host 2 at the selected exhibition object 1, and then press the fire button 431 to transmit the ID address code of the slave and selected language code to the host 2 (see FIG. 1) in a wireless manner. The second wireless transceiver module 23 of the host 2 sets the paging frequency subject to IEEE802.15 communication protocol to page the slave 3 that initiated the download program. After establishment of a piconet, with the slave 3, the host 2 transmits the voice guiding-tour data digital file corresponding to the assigned exhibition object 1 to the memory of the slave 3 that requires download. After download, the indicator 37 or display device 41 of the slave 3 gives an indication signal, and at the same time the slave 3 leaves the piconet. At this time, the visitor can operate the button 425 to playback the voice guiding-tour data digital file, and use the volume adjuster 526 to regulate the voice volume.

Referring to FIG. 2, the host 2 comprises a memory slot 21, a first wireless transceiver module 22, a second wireless transceiver 23, a microcontroller 24, a memory 25, a power module 26, and an indicator 27.

The memory slot 21 is for the insertion of at least one memory card 5. The memory card 5 has recorded therein voice guiding-tour data digital file for the exhibition object 1, such as voice guiding-tour data in Chinese, French, English, and Japanese language. The number of languages and the volume of the content may be increased or reduced subject to actual requirements. The content of the data digital file recorded in the memory card 5 can be transmitted via the wireless transceiver module 23 in a wireless manner. The voice data digital file is a compressed file, saving much the memory capacity and reducing the transmission time. The compression method can be but not limited to MP3 format (MP3, the MPEG-1 MPEG-2 Audio Layer III, is a standard technology and format for compression a sound sequence into a very small file).

The first wireless transceiver module 22 is an infrared transceiver module comprised of a transceiver RX221, TX222 and an IrDA module for infrared communication with the slave 3 that requests for download. The communication angle of infrared IrDA is ±15° conical angle within a limited range, normally, one meter. Therefore, it has a good directional characteristic, avoiding selection error. Increasing the power can extend the effective communication distance.

The second wireless transceiver 23 is an IEEE802.15 transceiver module, having network characteristics of directionless, lower power, short distance (10 meters), and high penetrability. It can transmit the voice guiding-tour data digital file to the slave 3 during movement of the visitor.

The microcontroller 24 is coupled to the memory slot 21, the first wireless transceiver 22 and the second wireless transceiver 23 to run operating system (OS), and IrDA and 802.15 standards for controlling the operation of the host 2.

The memory 25 is coupled to the microcontroller 24 for its operation. The power module 26 is to provide the system with the necessary working power. The power module 26 provides AC power supply mode and DC power supply mode for selection subject to in situ condition. The power module 26 comprises a supply circuit 262, a rechargeable battery 261, and a charging circuit 260. The charging circuit 260 is coupled to a battery charger (not shown) that can be a contactless induction type charging system for charging the rechargeable battery 261.

The indicator 27 is a LED (light emitting diode) indicator 27 adapted to indicate the working status of the host 2. The LED indicator 27 can be a single chip package or multicolor LED module disposed at one lateral side or behind the host 2 where it does not interfere with the visitor's line of sight. By means of the indication of the LED indicator 27, examination of communication status becomes easy.

The host 2 further comprises an anti-theft RF induction chip device 28 and a buzzer 29 for detection and warning subject to the control of an auto-detection security system in the exhibition place. Further, when the memory card 5 is inserted into the memory slot 21 or when the manager put the voice guiding-tour data digital file into the memory in a wireless manner by means of object push, the host automatically checks whether or not the file ID number is in conformity with the file ID number in the host, and drives the buzzer 29 to give a warning signal when not matched, facilitation error correction. This auto check function gives a warranty about correct installation of the content of the voice guiding-tour.

Referring to FIG. 3, the slave 3 comprises a first wireless IrDA transceiver module 32, a second wireless IEEE802.15 transceiver module 33, a microcontroller 34, a memory 35, a display driver 40, a display device 41, a key-button set 43, a voice output device 42, a power module 36, a fire button 431, and a LED indicator 37.

The first wireless transceiver module 32 is an infrared photoelectric transceiver module comprised of a receiver RX221, a transmitter TX222 and an IrDA module for directional connection with the selected host 2.

The second wireless transceiver 33 is a transceiver in conformity with IEEE802.15 PAN (personal area network). By means of the characteristics of directionless and high penetrability, the second wireless transceiver 33 can receive voice guiding-tour data digital file downloaded from the host 2 during movement of the visitor.

The microcontroller 34 is coupled to the first wireless transceiver module 32 and the second wireless transceiver 33 to control the operation of the slave 3.

The memory 35 is for the operation of the microcontroller (CPU) 34, having an expansion 351 for storing voice guiding-tour data digital file downloaded from the host 2.

The display driver 40 is coupled to the microcontroller 34, and controllable by the microcontroller 34 to drive the display device 41.

The display device 41 is a LCD display device that can be a single-color display or color display device. The display device 41 is coupled to the display driver 40 for display of the language selection menu of the voice guiding-tour data and other information such as operation indications and battery level.

The key-button set 43 is coupled to the microcontroller 34 via a control interface, and adapted to select and set the language of the voice guiding-tour data, comprising an upward selection button 432 and a downward selection button 433 to facilitate selection.

The voice output device 42 is coupled to the microcontroller 34 and adapted to decompress and output the voice guiding-tour data digital file that is stored in the memory 351, comprising a decompressor 421, a digital-to-analog converter 422, an audio amplifier 423, a speaker 424, a key-button set 425, and a volume regulator 426.

The decompressor 421 employs hardware decompression to decompress the voice guiding-tour data, enabling decompressed voice guiding-tour data to be inputted into the audio amplifier 423 via the digital-to-analog converter 422 for output through the speaker 424. The key-button set 425 of the voice output device 42 includes replay, fast, reverse and pause buttons.

The power module 36 comprises a supply circuit 362, a charging circuit 360, and a rechargeable battery 361. The charging circuit 360 is coupled to a battery charger (not shown). The battery charger is preferably a contactless induction type charging system for the advantages of easy management and operation. The power module 36 has an auto energy-saving control function, and adapted to provide the slave 3 with the necessary working power.

When pressed the fire button 431, the slave 3 sends out the data of its 802.15 address code and the assigned language code by means of infrared for starting the paging program for connection with the host 2. The LED indicator 37 is to indicate the connection status of the slave 3. It can be a multicolor LED indicator, for example, when the fire button 431 is pressed to run the infrared remote control startup program, the LED indicator 37 emits red light; when the host 2 is running 802.12 paging program and downloading of compressed voice guiding-tour data through the piconet is undergoing, the LED indicator 37 emits blue light; when the download action of the voice guiding-tour data is completed, the LED indicator 37 emits green light. Subject to the indication of the color of light emitted by the LED indicator 37, the user knows the status of the slave 3.

Figure 4:
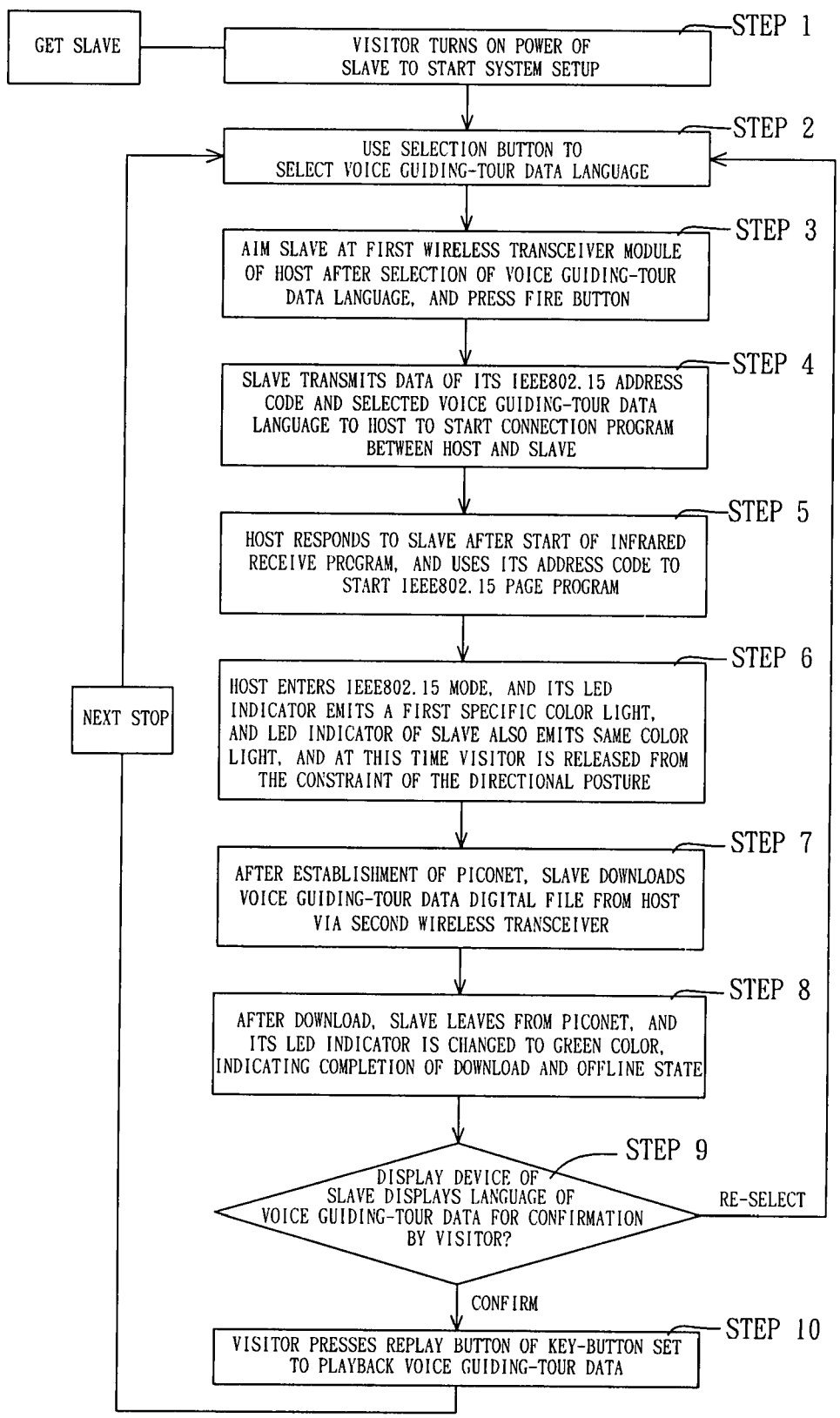
FIG. 4 is a flow chart of the voice guiding-tour system according to the present invention, showing wireless interconnection between the host and the slave and the procedure of download of digital file.

FIG. 4 is a flow chart of the voice guiding-tour system according to the present invention, showing wireless interconnection between the host and the slave and the procedure of download of digital file. As illustrated, the connection and data download operation between the host 2 and the slave 3 of the voice guiding-tour system includes the steps: the visitor turns on the power of the slave 3 to start system setup (Step 1); use the selection button 432 or 433 to select voice guiding-tour data language (Step 2); aim the slave 3 at the first wireless transceiver module 22 of the host 2 after selection of voice guiding-tour data language, and then press the fire button 431 (Step 3); after the fire button 431 is pressed, the slave 3 transmits the data of its IEEE802.15 address code and the selected voice guiding-tour data language to the host 2 to start the connection program for interconnection between the host and the slave (Step 4); the host 2 responds to the slave 3 after start of the infrared receive program, and uses its address code to start IEEE802.15 page program (Step 5); the host 2 enters IEEE802.15 mode at this time, and its LED indicator 27 emits a first specific color light, for example, blue light, and the LED indicator of the slave also emits the same color light, and at this time the visitor is released from the constraint of the directional posture (Step 6); after establishment of the piconet, the slave 3 downloads the voice guiding-tour data digital file from the host 2 via the second wireless transceiver 33 (Step 7); after download, the slave 3 leaves from the piconet, and its LED indicator 37 is changed to green color, indicating completion of download and offline state (Step 8); the display device 41 of the slave 3 displays the language of the voice guiding-tour data for confirmation by the visitor (Step 9); the visitor presses the replay button of the key-button set 425 to playback the voice guiding-tour data (Step 10).

During Step 2, the visitor can use the key-button set 43 (see FIG. 3) to select the desired voice guiding-tour data language that can be Chinese language, English language, French language, or Japanese language.

During Step 3, the visitor presses the fire button 431 after selection of the voice guiding-tour data language.

During Step 4, when the fire button 431 is pressed, the slave 3 transmits the data of its IEEE802.15 address code and the selected voice guiding-tour data language to the host 2 to start the 802.15 paging program of the host 2 for establishing a piconet between the host and the slave.

During Step 6, the LED indicator 37 of the host 3 is changed to a first specific color light, for example, blue light, showing active status of 802.15 communication mode. The LED indicator 37 can be a multicolor LED module.

During Step 7, the slave 3 downloads the voice guiding-tour data digital file from the host 2 by means of the 802.15 communication mode via the second wireless transceiver 33, and the LED indicator 37 maintains its first specific color, i.e., blue light.

During Step 8, after download, the slave 3 leaves from the 802.15 piconet, and its LED indicator 37 is changed to a second specific color, indicating completion of download. The second specific color can be green light.

During Step 9, the display device 41 of the slave 3 displays the language of the voice guiding-tour data for confirmation by the visitor. The display device 41 can be a LCD. If the user wishes to select the language again, return to Step 2.

During Step 10, the visitor presses the replay button of the key-button set 425 to playback the voice guiding-tour data.

Figure 5:
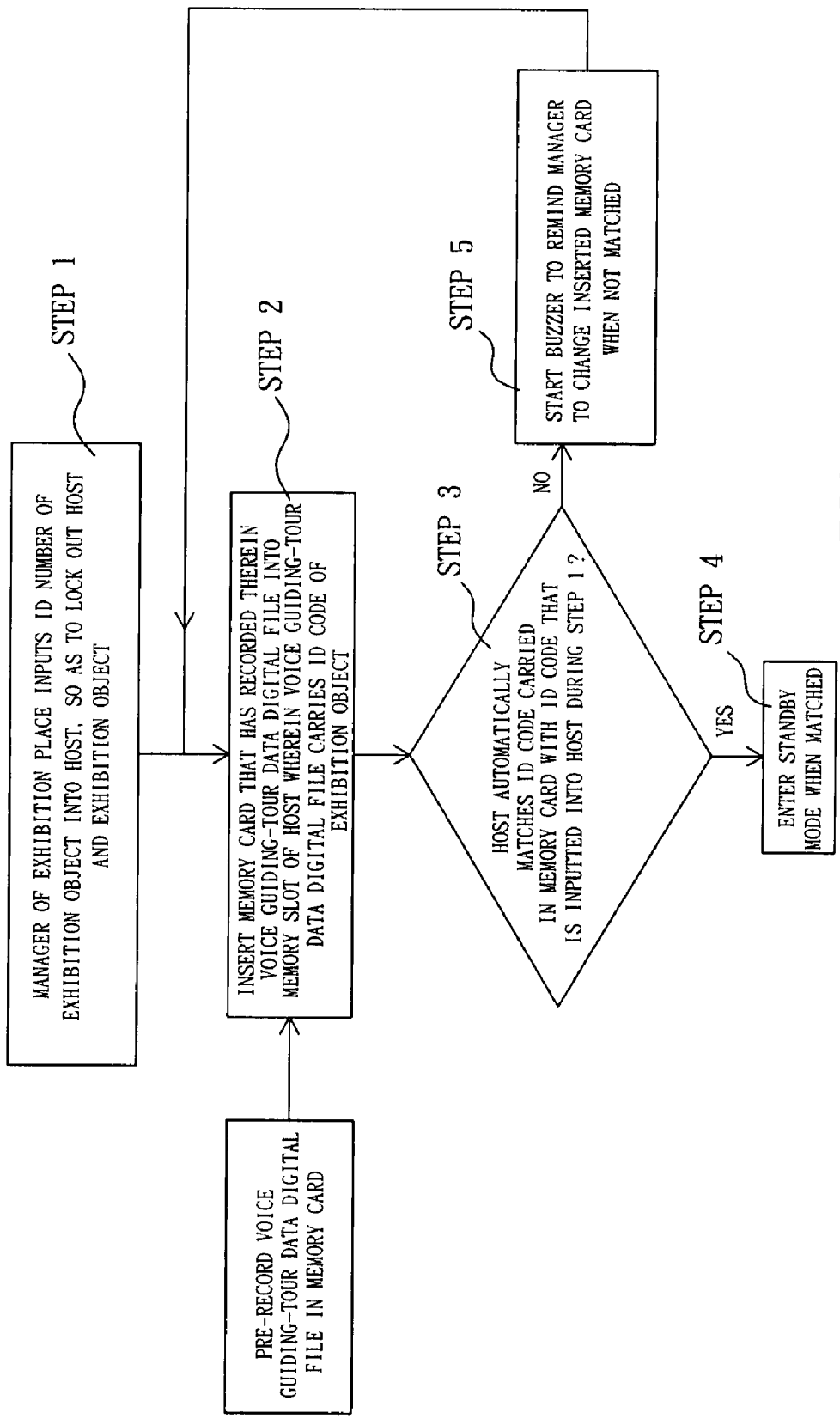
FIG. 5 is a flow chart of the voice guiding-tour system according to the present invention, showing establishment and management of a voice guiding-tour data digital file.

FIG. 5 is a flow chart of the voice guiding-tour system according to the present invention, showing establishment and management of a voice guiding-tour data digital file. As illustrated, the invention provides a method of establishing and managing a voice guiding-tour data digital file for a museum exhibition place. This embodiment uses a pre-recorded mobile memory card as a data storage medium. The establishment and management of a voice guiding-tour data digital file in accordance with the present invention includes the steps: the manager of the exhibition place inputs the ID number of the exhibition object 1 into a host 2, so as to lock out the host 2 and the exhibition object 1 (Step 1); insert the memory card 5 that has recorded therein a voice guiding-tour data digital file into one memory slot 21 of the host 2 (Step 2) wherein the voice guiding-tour data digital file carries the ID code of the exhibition object 1; the host 2 automatically matches the ID code carried in the memory card 5 with the ID code that is inputted into the host during Step 1 (Step 3); Enter standby mode when matched (Step 4); start a buzzer 29 to remind the manager to change the inserted memory card 5 when not matched (Step 5). Because there are usually many exhibition objects in exhibition in a museum, real-time error-correction of any erroneous file is difficult. Therefore, this auto check function is very helpful to management work.

During Step 1, the manager of the exhibition place inputs the ID number of the exhibition object 1 into a host 2, so as to lock out the host 2 and the exhibition object 1, wherein the ID code can be an optical barcode or RFID chip. The input method can be done by means of a machine, such as optical scanner or RF code reader, avoiding human error.

During Step 2, insert the memory card 5 that has recorded therein a voice guiding-tour data digital file into one memory slot 21 of the host 2 wherein the voice guiding-tour data digital file carries the ID code of the exhibition object 1. The voice guiding-tour data digital file is prepared subject to MP3 format (MP3, the MPEG-1 MPEG-2 Audio Layer III, is a standard technology and format for compression a sound sequence into a very small file) or similar compression technique. Further, the voice guiding-tour data digital file is a multi-language voice guiding-tour digital compression file.

Figure 6A:
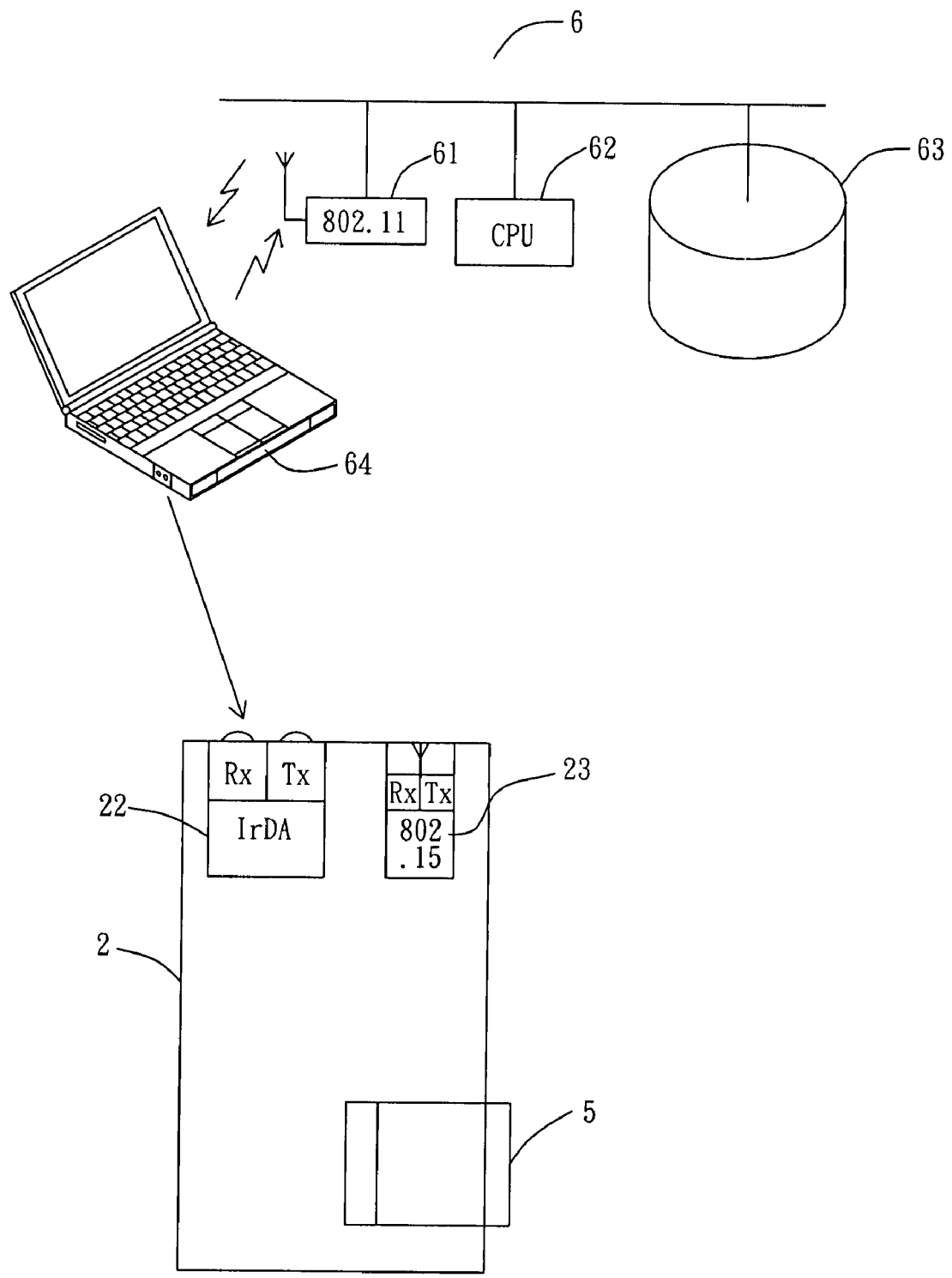
FIGS. 6a~6b are schematic drawings showing an alternate form of the voice guiding-tour system according to the present invention and the flow chart of the establishment and management of a voice guiding-tour data digital file in this alternate form of the voice guiding-tour system.
Figure 6B:
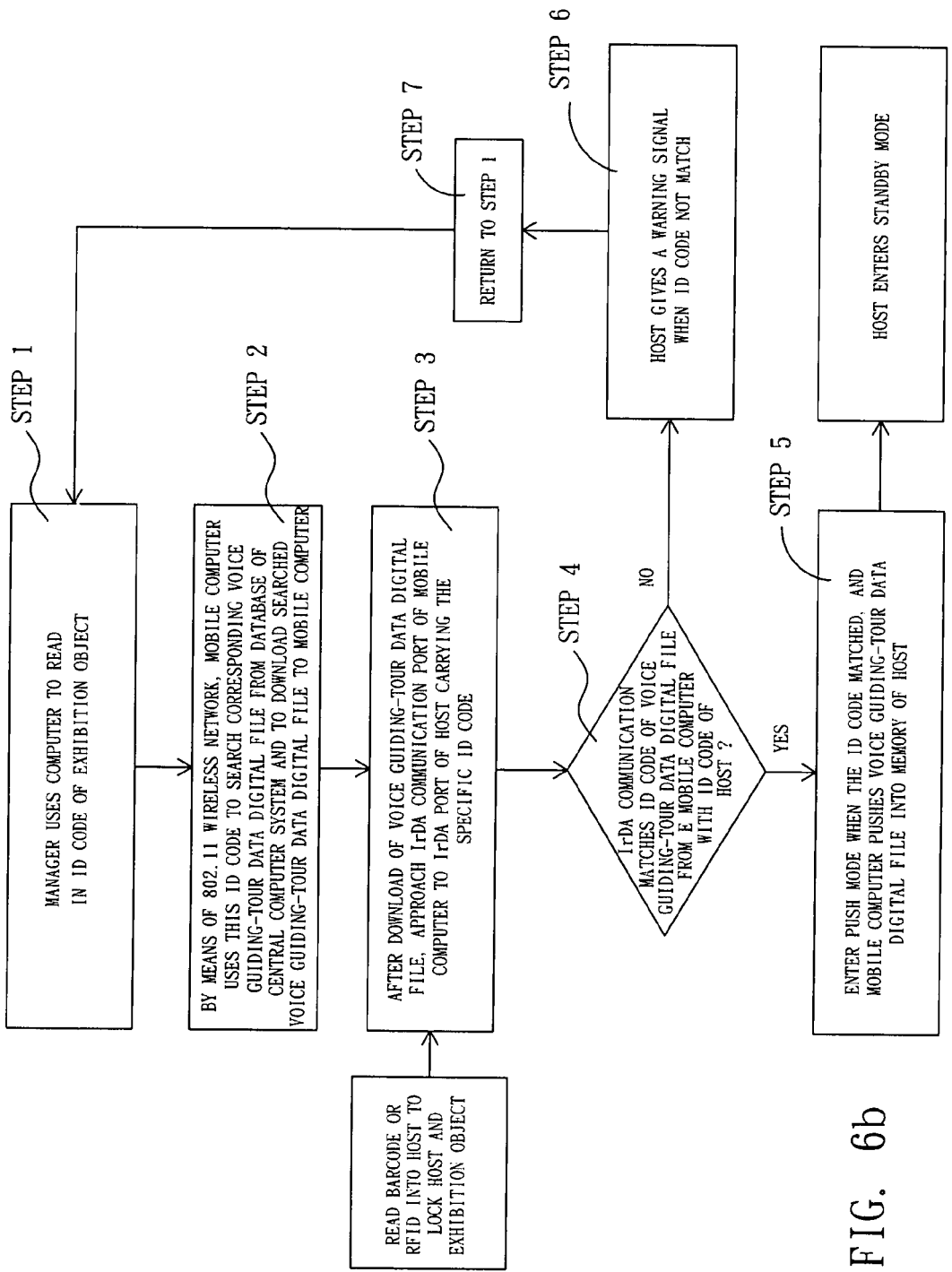

FIGS. 6*a*~6*b* are schematic drawings showing an alternate form of the voice guiding-tour system according to the present invention and the flow chart of the establishment and management of a voice guiding-tour data digital file in this alternate form of the voice guiding-tour system. This embodiment eliminates manual operation of mobile memory card, simplifying the management work. As shown in FIG. 6*a*, the establishment of the original voice data files for the exhibition place is done through a centralized manner. According to this embodiment, the voice guiding-tour system comprises a central computer system 6. The central computer system 6 comprises at least one wireless LAN (local area network) module 61, a CPU 62, and a database 63. Preferably, the wireless LAN module 61 is an IEEE802.11 wireless communication module. The database 63 has stored therein the voice guiding-tour data digital files for all exhibition objects 1. During establishment and maintenance of the files, the manager of the exhibition place can use a mobile computer 64 or like tool to connect to the wireless LAN module 61 of the central computer system 6 subject to IEEE802.11 wireless network communication protocol, downloading the related voice guiding-tour data digital files from the database 63. In addition to the 802.11 communication function for communication with the central computer system, the mobile computer 64 provides IrDA function. When carrying this mobile computer to a nearby place around the host 2 corresponding to one exhibition object, the mobile computer 64 and the host 2 are interconnected, entering the mode of Object Push, and the manager can push the voice file into the memory of the host 2. Thus, file establishment and updating works can be done when desired.

FIG. 6b is a flow chart showing the establishment and management of a voice guiding-tour data digital file in the alternate form of the voice guiding-tour system. The embodiment uses a mobile computer as a management medium. The operation includes the steps: the manager uses a specific mobile computer to read in the ID code of the exhibition object (Step 1); by means of 802.11 wireless network, the mobile computer uses this ID code to search the corresponding voice guiding-tour data digital file from the database of the central computer system and to download the searched voice guiding-tour data digital file to the mobile computer (Step 2); after download of the voice guiding-tour data digital file, approach the IrDA communication port of the mobile computer to the IrDA port of the host 2 carrying the specific ID code (Step 3); IrDA communication matches the ID code of the voice guiding-tour data digital file from the mobile computer with the ID code of the host 2 (Step 4); the mobile computer enters Push mode when the ID code matched, and pushes the voice guiding-tour data digital file into the memory 5 of the host 2 (Step 5) and then the host 2 enters standby mode; the host gives a warning signal when the ID code does not match (Step 6); and then return to Step 1 (Step 7).

According to this embodiment, the mobile computer is a common tool. Alternatively, the basic architecture of the mobile tool can be same as the slave shown in FIG. 3 with the exception of the use of an IEEE802.11b or IEEE802.11g wireless LAN module to substitute for the low power 802.15 PAN module. This change does not cost much because 802.15 and 802.11b or 802.11g are of 2.4 GHz ISM (industrial, scientific and medical) radio bands communication technique, having a similar antenna structure.

The physical layers and software of other IrDA-DATA standards are applicable. The audio output can be kept, however the barcode input interface 212 of the host shown in FIG. 2, such as USB, is needed to facilitate input of the ID code of each exhibition object by means of a barcode reader 4.

Because 802.11 and 802.15 are not simultaneously operated in-situ, they both can be used in the mobile management tool without considering the problem of interference, so that the manager can simulate actual operation of a visitor, forming a full-type managing system.

In the aforesaid embodiments, the communication method of the voice guiding-tour system according to the present invention uses IrDA mode to transmit the build-in address code in the 802.15 wireless module of the slave to the host, and the host pages the slave immediately after receipt of the address code, establishing connection. The use of IrDA mode is due to the following two reasons: (1) IrDA mode has good directional characteristic, avoiding selection error, and (2) a standard 802.15 page program pages all sleep state 802.15 units, this full channel scanning operation would waste much time. For example, 802.15.1 takes about 10.24 seconds to complete one full-channel scanning cycle. To provide the address code by means of IrDA mode saves much time, and the user needs not to wait too long. Further, the slave can be defined to have receiving mode only but not to scan, saving battery power consumption.

However, the directionless communication characteristic of 802.15 has its advantage. For example, when entered the effective communication range (10 meters) during the discover mode, every unit will discover the opposite unit and will then enter the standby mode for wakeup upon connection.

What kind of communication combination to be adopted is determined subject to actual requirements. Every condition has its merits and demerits.

In conclusion, as described in the aforesaid embodiments, it is better to use the combination of 802.15 and 802.11 under current technical status. The use of this combination has the advantages of energy saving (this is important to handheld devices), interference protection, cost saving, ease of use. However, this combination is not a limitation.

In the aforesaid various embodiments, the guiding-tour system is a voice guiding-tour system. However, because the display device of the handheld slave of the guiding-tour system can display graphic guiding-tour data that can be prepared in a color status, static status, motion picture form, or any other technical extensions. Therefore, the invention provides a supplementary graphic guiding-tour.

Therefore, the present invention is to have the voice guiding-tour content of every exhibition object be stored in a respective host, and the guiding-tour device handheld by the visitor has the necessary communication means to download the assigned language of voice guiding-tour data digital file from the host of each exhibition object for replay subject to the visitor's instruction. Therefore, the invention eliminates the drawbacks of conventional guiding-tour devices, and overcomes the problem of conventional lot based update work in guiding-tour management.

Although particular embodiments of the invention has been described in detail for purposes of illustration, various modifications and enhancements may be made without departing from the spirit and scope of the invention. Accordingly, the invention is not to be limited except as by the appended claims.

What is claimed is:

1. A method of establishing a voice guiding-tour data digital file in a host of a voice guiding-tour system, said voice guiding-tour system comprising at least one host and one slave, the at least one host each specifically corresponding to one respective exhibition object, the at least one host each comprising one respective voice guiding-tour data digital file of voice guiding-tour data digital files of the voice guiding-tour system, the voice guiding-tour data digital files of the voice guiding-tour system being respectively stored in the hosts of respective exhibition objects, one exhibition object corresponding to one respective guiding-tour data digital file, wherein the voice guiding-tour system uses a mobile memory device as a storage medium and has self-check capability; the method comprises the steps of: reading the identification code of each exhibition object into a respective slave; inserting a memory device having recorded therein a voice guiding-tour data digital file carrying the identification code of one exhibition object into one memory slot of the host; the host uses a built-in software to match the identification code of the voice guiding-tour data digital file in the inserted memory card with the identification code of the exhibition object stored therein; the host enters standby mode and starts an indicator light if the identification code is matched, the host gives a warning signal if the identification code is not matched.

2. A method of establishing a voice guiding-tour data digital file in a host of a distributed type voice guiding-tour system, said distributed type voice guiding-tour system comprising at least one host and one slave, the at least one host each specifically corresponding to one respective exhibition object, the at least one host each comprising one respective voice guiding-tour data digital file of voice guiding-tour data digital files of said distributed type voice guiding-tour system, the voice guiding-tour data digital files of said distributed type voice guiding-tour system being respectively stored in the hosts of respective exhibition objects, one exhibition object corresponding to one respective guiding-tour data digital file, said distributed type voice guiding-tour system further comprising a central computer database and a manager mobile device; wherein said distributed type voice guiding-tour system uses a mobile management tool as a storage medium and has self-check capability; the method comprises the steps of: the manager uses the mobile management tool to search and download a voice guiding-tour data digital file corresponding to an exhibition object from the central computer database; the manager uses the mobile management tool to push the downloaded voice guiding-tour data digital file into the memory device of the host of the respective exhibition object wirelessly; the host uses a built-in software to match the identification code carried in the received voice guiding-tour data digital file with the identification code of the respective exhibition object stored therein; the host enters standby mode and starts an indicator light if the identification code is matched, the host gives a warning signal if the identification code is not matched.

* * * * *